March 28, 1967 A. J. URBANIC ET AL 3,311,527
POLYURETHANE COATED FABRIC
Filed Jan. 20, 1964 2 Sheets-Sheet 1
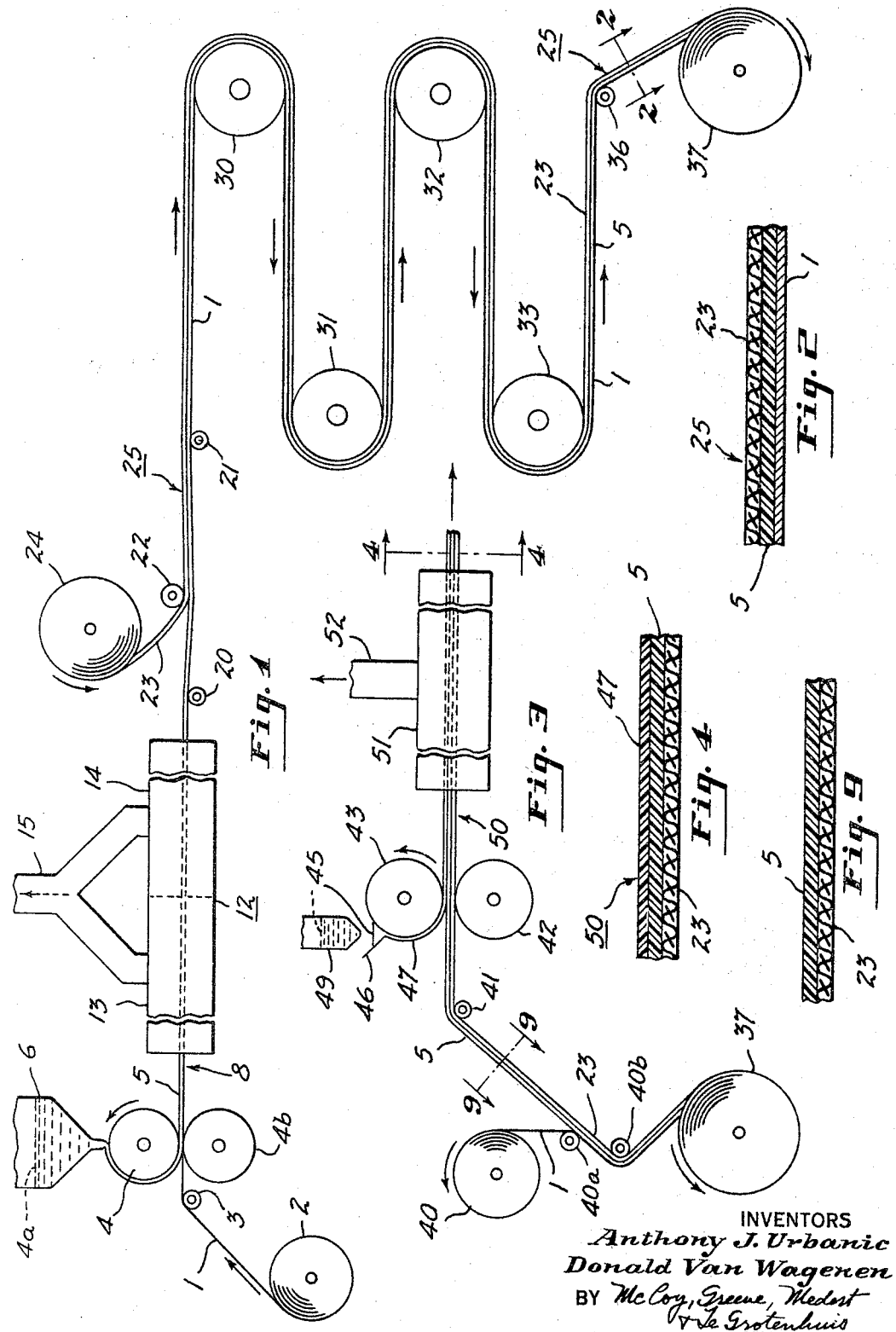

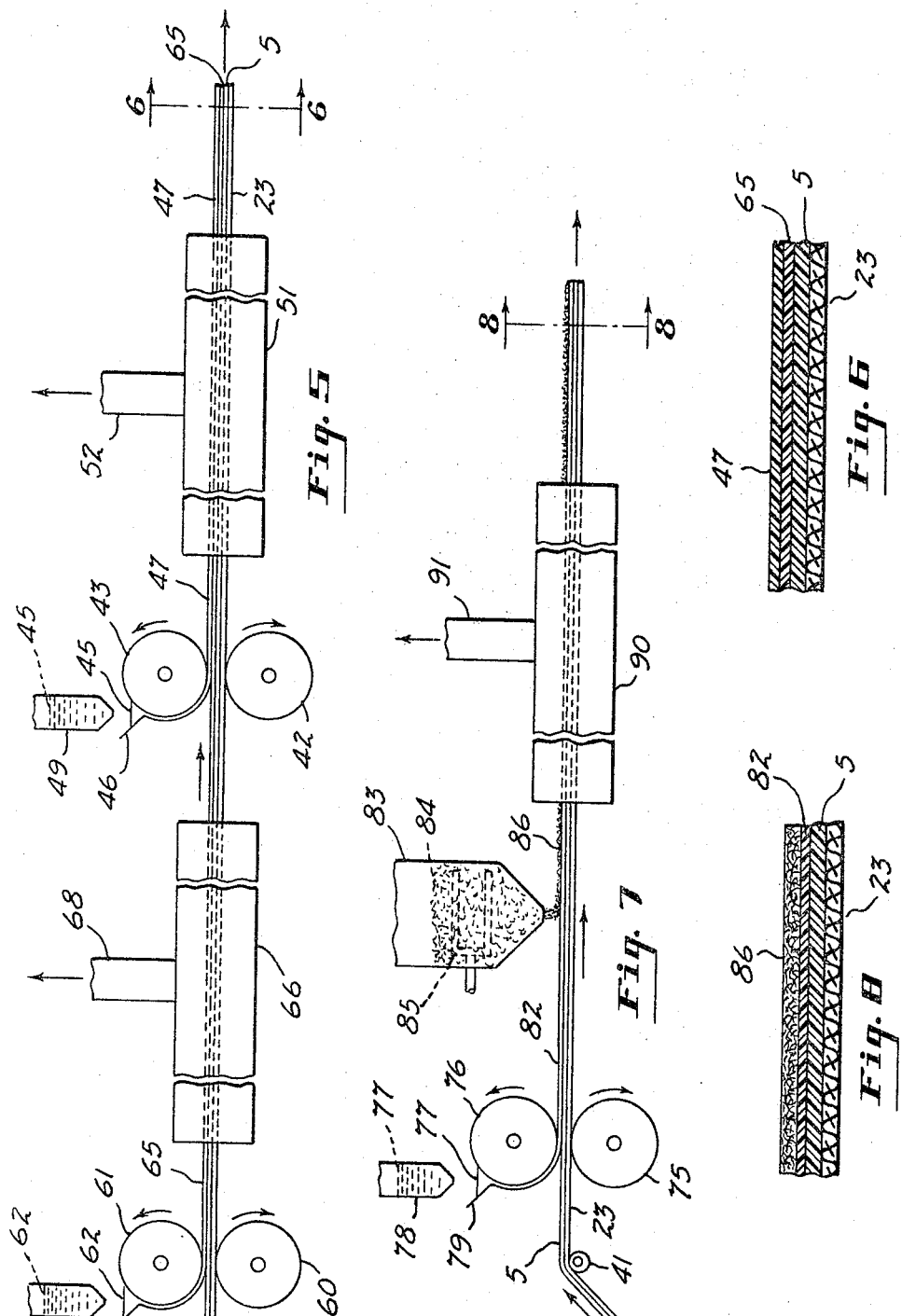

United States Patent Office 3,311,527
Patented Mar. 28, 1967

3,311,527
POLYURETHANE COATED FABRIC
Anthony J. Urbanic, Akron, and Donald Van Wagenen, Alliance, Ohio, assignors to The General Tire & Rubber Company, Akron, Ohio, a corporation of Ohio
Filed Jan. 20, 1964, Ser. No. 338,826
10 Claims. (Cl. 161—64)

The present invention relates to lightweight coated fabrics or laminates having excellent hand and drape and to methods for making the same.

An object of the present invention is to provide lightweight, soft, coated fabrics or laminates having excellent hand and drape and which can be employed in making clothing.

Another object is to provide methods for making lightweight, soft, coated fabrics or laminates having excellent hand and drape and which can be used to make clothing.

These and other objects and advantages of the present invention will become more apparent to those skilled in the art from the following detailed description and drawings in which:

FIGURE 1 is a diagrammatical elevational view of an arrangement of apparatus for making an initial laminate according to the present invention;

FIGURE 2 is a cross-sectional view along the line 2—2 of FIGURE 1;

FIGURE 3 is a diagrammatical elevational view of another arrangement of apparatus for removing a release layer and applying a slip coating to a portion of the laminate of FIGURE 1;

FIGURE 4 is a cross-sectional view of the laminate along line 4—4 of FIGURE 3;

FIGURE 5 is a diagrammatical elevational view of another arrangement of apparatus for applying a patent leather type coating to the laminate;

FIGURE 6 is a cross-sectional view of the laminate along the line 6—6 of FIGURE 5;

FIGURE 7 is a diagrammatical elevational view of still another arrangement of apparatus for applying a flocking coat to the laminate;

FIGURE 8 is a cross-sectional view of the laminate along the line 8—8 of FIGURE 7; and FIGURE 9 is a cross-sectional view of the laminate along the line 9—9 of FIGURE 3.

According to the present invention a particular type of polyesterurethane-resin scuff resistant composition is coated on release paper and substantially dried to obtain a tacky surface and thereafter a lightweight fabric is applied to the scuff resistant coating. The assembly is then heated to cure the polyurethane-resin layer. Next the release paper is removed from the urethane-resin scuff resistant layer. A slip coating of a urethane-resin formulation is then applied to the scuff resistant layer, dried and cured to form a laminate suitable for use in making sportswear or rainwear. In a modification of this process an intermediate layer of a patent leather type composition coating is applied and dried before the application of the slip coating. In another embodiment of the invention, the scuff resistant coating is coated with adhesive and flocked to provide a material useful for dresswear and under garments. Products produced by the methods of the present invention have excellent hand, drape and feel. They are lightweight and soft yet have excellent strength and durability. Moreover, their breathability is better than that of vinyl coated fabrics. These laminates are dry cleanable.

As shown in FIGURES 1, 2 and 9 of the drawings release or backing paper 1 is removed from roll 2 containing a supply of said paper and moves in the direction of the arrow over carrier roll 3 and under roller coater 4 carrying a layer of a polyester-urethane prepolymer-resin composition in solution in an organic solvent 4a from supply tank 6 to coat said paper with a layer of said composition at room temperature (about 25° C.), to form scuff resistant coating 5. In place of using a roller coater the composition can be applied onto the surface of the paper by means of a doctor blade, spraying and so forth. Furthermore, in place of making a polyesterurethane prepolymer-resin composition, all of the necessary ingredients of the composition can be supplied separately or in certain combinations to a mixing head, intimately mixed together and discharged onto the roller coater or directly onto the paper in a "one-shot" step as is known in the polyurethane art. Next, the urethane coated paper laminate 8 is passed through heating chamber or oven 12 using hot air and having two heating zones 13 and 14 of approximately equal length. The heating chamber may be of any suitable length to achieve the desired degree of solvent removal from the polyurethane coating composition so that the urethane composition base layer on the paper forms a solid tacky layer. In other words the urethane layer after passing through the oven is sufficiently firm so that when it is contacted by fabric it will adhere to the fabric to cause very little or no strike through of the urethane composition although there may be some penetration of the fibers of the fabric to obtain some additional mechanical adhesion. Generally zone 13 is maintained at a temperature of about 190° F.±10° and zone 14 is maintained at a temperature of about 250° F.±10° although somewhat higher or lower temperatures can be used. The solvent vapors may be exhausted through stack 15 or passed to a condenser or other suitable means for collecting the solvents. When oven 12 has a length of about 50 feet a suitable residence time for the moving urethane coated laminate 8 will be about two minutes at the above temperatures to avoid blistering of the coating. Depending on the thickness and type of urethane composition used, the residence time, length of the oven and heating temperatures may be varied as required to get the desired results (tacky coating free of blisters etc.). More than two heating zones may be used of varying temperatures or only one heating zone can be used which can be of constant temperature or which can contain a number of heating means at various temperatures. Roll 4b supports the laminate under coater 4.

The dried, tacky urethane coated paper 8 passes over carrier rolls 20 and 21 positioned in a manner or at a speed so that laminate 8 can sag or droop between these rolls. In this area roller 22 spreads out fabric 23 from fabric roll 24 into contact with the upper surface of laminate 8 with very light pressure. The bottom portion or periphery of roller 22 is approximate the top portions or peripheries of rollers 20 and 21. In other words the fabric is "kiss-coated" onto the urethane layer to make fabric surfaced laminate 25. The light pressure of the fabric itself against the tacky surface of the urethane layer provides sufficient adhesion between the two layers. Next laminate 25 is passed over hot or heating cans or rolls 30, 31, 32 and 33 maintained at a temperature of about 220° F. by means of low pressure steam, although temperatures of up to 250 or 300° F. may be used, to set-up or partially cure the urethane layer. Also, further adhesion of the urethane layer to the fabric may occur as the laminate passes over the heating cans due to some softening of the urethane coating. Laminate 25 then passes over carrier roll 36 and is wound upon roll 37. Roll 37 containing wound-up laminate 25 is then stored in air at room temperature for from about 24 to 72 hours to complete the curing of the urethane layer. While 4 heating cans or rolls 30-33 have been shown, it is clear that a smaller or larger number can be used depending on the thickness and type of urethane layer and so forth. Also, in place of curing rolled up laminate 25 on roll 37 in air, laminate 25 can be passed in the form of a plurality of festoons through a hot air oven operating at 250 to 280° F. for from about 3 to 1½ minutes to effect essential or complete curing of the urethane layer. It will be appreciated that the temperatures used during the solvent release, heating and curing cycles should be below those temperatures which would adversely affect the paper layer, urethane layer or the fabric layer. FIGURE 2 in particular shows the laminate 25 comprising release paper layer 1, polyurethane-resin layer 5 and fabric layer 23. FIGURE 9 shows the laminate of FIGURE 2 with the releasable paper removed, i.e., the scuff resistant polyesterurethane-resin layer 5 on the fabric 23.

As shown in FIGURES 3 and 4 of the drawings laminate 25, after curing, is withdrawn from roll 37 and release paper layer 1 is separated from the laminate and wound up on roll 40. The remainder of the laminate passes over carrier roll 41 and between pressure roll 42 and printing roll 43. The pressure roll 42 may be covered with felt or rubber. The printing roll has a fine screen or etched surface designed to hold sufficient material to transfer a layer of liquid slip coating composition 45 from trough 46 to the surface of the scuff resistant coating to form a continuous film 47 thereon. Supply tank 49 is positioned above the trough to furnish the liquid composition as needed. The laminate 50 then passes through oven 51 at a temperature of about 180 to 200° F. in 15 to 20 seconds. The oven is of sufficient length for removal of the solvent which is vented through pipe 52. The laminate may then be passed over heating cans and wound up for final curing in the roll or festooned through a drying oven as shown by and/or discussd supra with reference to FIGURE 1. Film 47 due to the amount of resin therein does not delaminate when unwound from the roll after curing. Film or layer 47 forms a top or slip coat on the scuff resistant coating 5. FIGURE 4 shows fabric 23, polyurethane-resin scuff resistant layer 5, and slip coat 47. The finished laminate is then wound on spindles for shipment to garment manufacturers. Tensioning rolls 40a and 40b are between rolls 37 and 40.

In the modification of the present invention as shown in FIGURES 5 and 6 (wherein roll 37 and the paper separation step of FIGURE 3 have not been shown) of the drawings, the cured laminate of the scuff resistant resin 5 on the fabric 23 is passed between rollers 60 and 61. Roll 60 is a rubber covered roll similar to roll 42 and roll 61 is a printing roll like roll 43. Printing roll 61 delivers a "patent" leather type of composition 62 from trough 63 and supply tank 64 to the surface of cured layer 5 to form "patent" layer 65. The resulting laminate is then passed through drying oven 66 at a temperature of from 180 to 200° F. for from 15 to 20 seconds to remove the solvent from layer 65. The oven is of sufficient length and/or the time the fabric passes through the oven is sufficiently long to remove the solvent which leaves by pipe 68 and cure or at least substantially cure the layer 65. Next layer 65 is coated with the slip coating composition which is printed on from printing roller 43 and passed through oven 51 to dry the slip coating as discussed above with respect to FIGURE 3. In the preparation of the "patent" type laminate it is preferred that the fabric be of polyester (Dacron) fibers or mixtures of polyester and cotton to avoid nonuniform shrinkage (causing a rippled appearance) which can sometimes occur with nylon fabrics. The polyester fabric, having a desired weight of from about 1.00 to 1.40 oz./sq. yd., preferably, also should have a high count, i.e., about 110/105. "Hight count" means a high thread count in the fabric; the thread count, the number of warp and filling threads per inch in a fabric, is determined most easily by a direct count with the aid of a pick counter.

Moreover, it is preferred that in the scuff resistant composition (layer 5) the resin and catalyst be used in the lower amounts of the ranges shown below. The "patent" leather type composition should be deposited in an amount sufficient when dry to provide a coating having a weight of from about 0.25 to 1.0, preferably about .75 oz./sq. yd. Here, the slip coating can be applied to provide a layer of 0.1 to 0.25 oz./sq. yd. when dry.

FIGURES 7 and 8 show a further modification of the invention. Here the laminate of the scuff resistant layer 5 and fabric 23 after being withdrawn from roll 37 and after the release paper 1 has been removed is passed between rollers 75 and 76. Roller 75 is a rubber covered pressure roller like roll 42 while roll 76 is a printing roller like roll 43. An adhesive composition 77 is fed from tank 78 to trough 79 where it is eventually deposited on scuff resistant layer 5 as adhesive layer 82. The adhesive layer then passes under dusting or flocking apparatus 83 containing flock 84 and beater bar 85 (driven by suitable means not shown) for agitating the flock which is then deposited on the surface of the tacky adhesive (or cement). The laminate containing flock coating or layer 86 is passed through drying oven 90 having vent 91 for removal of solvent carrier where the adhesive is dried and cured to secure the flock to the scuff resistant layer. The drying oven operates at a temperature of from about 280 to 300° F. and the laminate passes through it in about a minute. After drying, the flocked laminate can be wound up for shipping or storing. Instead of using the apparatus shown for flocking other well known apparatus can be used for flocking or dusting finely divided particles onto the adheseive coated laminate. Electrostatic flocking can be used if desired.

Sufficient adhesive and flock are applied to increase the weight of the laminate from about 1 to 2 oz./sq. yd. For most applications the weight increase of the adhesive and flock to the laminate should preferably be in the range of about 1.40 to 1.65 oz./sq. yd. The fabric 23 used in the construction shown in this embodiment is preferably a double woven brushed nylon-rayon blend. The resulting laminate using cotton flock is very useful for undergarments. When the fabric is about a 40 denier nylon tricot and cotton flock is employed, a laminate very suitable for dress goods is produced. If the scuff resistant polyesterurethane-resin layer was eliminated and the adhesive and flock applied directly to the fabric, a boardy product would be obtained rather than a product having excellent drape, hand and feel as produced by the present invention. Flocking gives a soft, chamois or suede-like feel.

(1) THE RELEASABLE BACKING (1)

The releasable backing should be a carrier of sufficient strength and dimensional stability to hold the urethane coating and fabric properly and be capable of being passed through the apparatus shown. The carrier can be paper, nylon, Mylar, cellophane coated on the surface to be adjacent the urethane composition layer with a suitable release material. If the laminate is to be wound up before complete curing, the carrier may be coated on both surfaces with the release material. For example, it can have a silicone coating to serve as the release material. Alternatively, it can be coated with Teflon or other fluorinated hydrocarbons, polypropylene, polyethylene and so forth. In place of the silicone etc. coated paper, other materials can be used which have release properties such as flexible films of polypropylene and the like. It is desirable that the surface of the release paper be planar or smooth or essentially planar especially when applying "patent" finish coats although a slight embossing will afford finishes like natural patent leather. On the other hand, if it is desired that the scuff coat have a grain or pattern, release papers having a variety of grains can be used.

(2) THE POLYURETHANE-RESIN COMPOSITION COATING (5)

The polyurethane-resin composition for making a scuff resistant coating comprises a polyesterurethane prepolymer (or a polyester and an organic diisocyanate in an amount sufficient to form a polyesteururethane prepolymer), a solvent soluble resin having active hydrogen atoms for cross linking, a diol, a small amount of a slightly branched polyester as a pigment vehicle and cross linker, a tin catalyst, a silicone, pigment(s) and organic solvents. By scuff resistant is meant a material which is resistant to impact load. Scuffing can be defined as a milder form of abrasion such as the wear which occurs by occasionally hitting against an object.

(a) The diisocyanates used in making the polyurethane are preferably aliphatic diisocyanates having from 6 to 10 carbon atoms, especially in a straight chain, between the isocyanato radicals such as hexamethylene diisocyanate, decamethylene diisocyanate and so forth. In addition to straight chain diisocyanates cycloaliphatic diisocyanates such as hydrogenated methylene bis phenyl diisocyanate can be used. However, where discoloration is not a problem, aromatic diisocyanates may be used such as a 2,4- and 2,6-tolylene diisocyanates, methylene bis phenyl diisocyanate and so forth. Mixtures of diisocyanates can be used.

The polyester should have at least two OH groups and have an average molecular weight (weight average) of from about 2000 to 2400, preferably from about 2100 to 2200. It is made by reacting an excess molar amount of a glycol such as one having from 2 to 6 carbon atoms, preferably in a straight chain between —OH groups, such as ethylene glycol, 1,4-butylene glycol, propylene glycol, dipropylene glycol, 1,6-hexane diol and so forth and mixtures thereof with a dicarboxylic acid having from about 4 to 8 carbon atoms, preferably in a straight chain, between —COOH groups. Examples of suitable acids are adipic acid, azelaic acid, sebacic acid and so forth and mixtures thereof. To avoid water sensitivity when ethylene glycol is used in making the polyester, it should be mixed with another glycol having 3 or more carbon atoms. A very useful polyester is one obtained by reacting an excess of a mixture of 60 mol percent ethylene glycol and 40% 1,4-butylene glycol with adipic acid. Methods of making polyesters are well known to the art. They should be free of water or at most contain only a trace of water.

The polyesterurethane prepolymer is made by reacting preferably about 2 equivalents of the organic diisocyante with one equivalent of the polyester diol or mixtures of such polyesters so that the diisocyante is added only on each end of the polyester molecule. The average molecular weight (weight average) of the resulting polyesterurethane prepolymer is from about 2500 to 3500, preferably from about 2500 to 3000. The prepolymer has a viscosity of over 7000 centipoises in chlorobenzene and a free NCO content or from about 1 to 5%, preferably about 3.5%. Considering the whole scuff resistant composition, there should be from about 5 to 25%, preferably from about 10 to 15%, excess moles of —NCO groups over the sum of the moles of active hydrogen containing groups (OH groups and any COOH groups) contained in the polyester used in the prepolymer, the resin, the diol and the slightly branched polyester to obtain the best physical properties and good humidity aging. Excess NCO provides cross linking to form biuret, allophonate groups etc. Very little or no NCO remains after a few days.

(b) The solvent soluble resin having active hydrogen atoms to be used in crosslinking the prepolymer can be any resinous substance which when free of solvent is a horny (hard, tough and tack-free) material at room temperature. It must be soluble in the volatile organic solvent(s) used to deposit the scuff resistant coating on the carrier prior to curing, preferably in low molecular weight ketone solvents or mixtures of such ketones and aromatic solvents or low molecular weight esters. It, also, must be compatible with the polyurethane to form homogenous films which do not craze on elongation (greater than 50%) of the composition. By crazing is meant the translucent or opaque whiteness which occurs on stretching an unpigmented transparent film. Examples of such solvents are methyl ethyl ketone, methyl isobutyl ketone, toluene, low molecular weight esters and so forth. The resin should contain from about 0.5 to 7% by weight active hydrogen as OH and/or COOH groups. Most preferably, the resin should contain from about 2 to 3% OH groups (active hydrogen). Examples of resins which can be used are cellulose acetate butyrate having the general formula $(C_{12}H_{14}O_4(R)_x(R')_y)_z$ where R is $OCOCH_3$ or OH, R' is $OCOC_3H_7$ or OH, $x$ is a number from 1 to 5, $y$ is a number from 1 to 5, and $z$ is a number greater than 3, there being sufficient $x$ and $y$ as OH to be within the above ranges for active hydrogen; a terpolymer of about 86% vinyl chloride, 13% vinyl acetate and 1% maleic acid or other dibasic acid (about 0.7–0.8 carboxyl); a copolymer of vinyl chloride and beta hydroxy ethyl acrylate; and a terpolymer of vinyl chloride, methyl methacrylate, and beta hydroxy propyl methacrylate. An example of a very useful resin is a copolymer of about 91% vinyl chloride and 9% vinyl acetate which has been partially hydrolyzed to give an OH content of about 2.3% (VAGH; Union Carbide Corporation). Still other useful types of resins to employ are the phenoxy resins (end treated condensation products of Bisphenol A and epichlorohydrin) having the general formula:

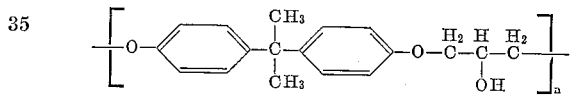

where $n$ is $\cong 100$. The resins used may have average molecular weights of from about 2,500 to 350,000. The resin is used in an amount of from about 8 to 18, preferably from about 10 to 16, parts by weight per 100 parts by weight of the prepolymer to give the best combination of rapid gelation permitting lamination to the fabric without excessive penetration of coating into the fabric.

(c) The diol which is employed as a chain extender is a low molecular weight glycol having from 3 to 6 carbon atoms such as diethylene glycol, 1,3-propylene glycol, 1,4-butane diol, 1,5-pentamethylene glycol, 1,6-hexane glycol, 2,4-hexane glycol, dipropylene glycol etc. Ethylene glycol and 1,2-propylene glycol are not desirable. The glycol is preferably a straight chain glycol and should have at least 3 carbon atoms between OH groups. The glycol is used in an amount of from about 1 to 3, preferably from 1.5 to 2.5 parts by weight per 100 parts by weight of the prepolymer to give the required adhesion to the fabric.

(d) A slightly branched polyester is used in a small amount as a reactive vehicle for the pigment which is intimately dispersed in it. The polyester is OH terminated and has an average molecular weight (weight average) of from about 2000 to 4000, preferably from about 2150 to 2250. It is prepared by reacting an excess of a glycol with a dicarboxylic acid and a small amount of a polyfunctional material, such as trimethylol propane, hexane triol, pentaerythritol, sortibol and so forth having more than 2 hydroxyl groups, preferably from 3 to 6 —OH groups. The polyfunctional material is used in an amount of from about 0.01 to 10 mol percent on the total mols of glycol, dicarboxylic acid and polyfunctional material used to make the polyester. The same acids and glycols can be used in making this polyester as described supra with respect to the preparation of the polyester used in making the polyurethane prepolymer. From about 10 to 30, preferably from about 18 to 22, parts by weight of this polyester is used per 100 parts by weight of the polyester-urethane prepolymer. A very useful polyester is one of dipropylene glycol, adipic acid and trimethylol propane having an average molecular weight of about 2200 (Foamrex 50, Witco Chem. Co.).

(e) A tetravalent organic tin salt catalyst soluble in the composition is preferred to promote the desired rate of cross-linking and a pot life for the composition of from 3 to 4 hours at a temperature of from about 20 to 30° C. While other organo metallic compounds can be used they are slower curing at the higher levels of catalyst content and give lower tensile strength and tear resistance to the polyurethane-resin layer even at higher levels. The tin salt catalyst has the general formula $R_x(Sn)(OOR')_y$, where $x$ is a number from 1 to 3 and $y$ is a number from 3 to 1, R is an alkyl group of from 2 to 8 carbon atoms and R′ is an aliphatic hydrocarbon group, preferably alkyl, of from 6 to 18 carbon atoms. Examples of useful tin catalysts are dibutyl tin dilaurate, diethyl tin dilaurate, dihexyl tin dicaproate, dioctyl tin dilaurate, trihexyl tin caproate, dioctyl tin distearate, diamyl tin distearate, ethyl tin trilaurate and so forth and mixtures thereof. The ratio of the polyurethane prepolymer to the horny resin to the catalyst is critical in the layer of the polyurethane prepolymer to avoid blistering etc. At an upper limit of 16–18 parts of resin per 100 of prepolymer, the catalyst can be used in an amount of from about 0.05 to 0.15 part by weight per 100 of prepolymer without blistering. If more resin and catalyst is used, the mixture will gel too fast before the solvent is released to cause blistering, and, moreover, the maximum modulus value of 200 p.s.i. at 100% elongation will be exceeded to lose the desired drape. On the other hand at 8–10 parts resin per 100 prepolymer, the catalyst is used in an amount of 0.20 to 0.25 part by weight per 100 prepolymer to form a blister free coating sufficiently dry to laminate to the fabric without strike through. However, the catalyst level should not go above about 0.25 part as then resistance to hydrolytic degradation drops off rapidly. At less than 8–10 parts resin per 100 prepolymer, the gel strength of the prepolymer-resin layer is too weak for lamination to the fabric and the viscosity of the composition is so low that it will wick into the fabric layer before curing properly to give a boardy product. Accordingly, based on 100 parts by weight of prepolymer the ratios of resin to catalyst are about 18:0.05 to 8:0.25.

(f) A surface tension reducer or surfactant should be employed to improve wetting and leveling of the composition over the release paper without excess air entrapment. Water soluble silicones or nonyl phenoxy polyalkylene oxy alkanols etc. may be used. Preferred materials are the polysiloxane polyoxyalkylene block copolymers. Examples of such silicone block copolymers are shown in the U.S. patent to Bailey and O'Connor, Patent No. 2,834,748, issued May 13, 1958. A preferred silicone to use as shown in the patent has the general formula:

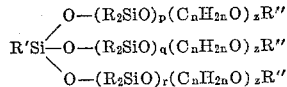

The silicone block copolymer is used in an amount of from about 0.5 to 1.5 parts by weight per 100 parts by weight of the prepolymer. Greater amounts are to be avoided since they may interfere with any subsequently applied coatings.

(g) Various finely divided pigments can be used in the composition such as calcium carbonate, silica, calcium silicate, phthalocyanine green, phthalocyanine blue, iron oxide, titanium dioxide, carbon black (medium and high color channel blacks), bone black, chrome yellow, toluidine reds, cadmium reds, cadmium yellows and so forth. The calcium carbonate is used for opacity while the silicas are used for flattening. Flatting agents which produce flattening are finely divided particles of irregular shape which when ground into a vehicle cause incident light to be reflected from a deposited film in a diffused rather than specular fashion. From about 1 to 10 parts by weight of the black pigments are used per 100 parts by weight of the prepolymer while from about 10 to 30 parts by weight of the other pigments are used per 100 parts by weight of the prepolymer. Mixtures of pigments can be used.

(h) Sufficient volatile organic solvents are used to obtain a solution (including the pigments etc.) having a solids content for the composition of from about 40 to 75, preferably from about 40 to 60%, by weight. Solvents which are required are low molecular weight alkyl ketones suhc as methyl ethyl ketone, methyl isobutyl ketone, diethyl ketone, dibutyl ketone, methyl butyl ketone and the like having from 3 to 8 carbon atoms and which are liquids at temperatures of from about 15 to 35° C. Mixtures of two or more ketones are desirable having a substantial difference in boiling points, 10–50° C., in order to get the desired rate of drying or evaporation and leveling without blistering (solvent blistering from too rapid surface skin formation). The different ketone solvents, high and low boiling, should be used in a ratio of from about 50 to 90 parts by weight of the low boiling solvent to from 50 to 10 parts by weight of the high boiling solvent for the best results. For example, if one ketone is used there may be insufficient leveling, blistering or an increase in drying time. If only one pigment is used or if only pigments are used having essentially the same density, only the ketone solvents need be employed. However, where the pigments have wide differences in specific gravities, it is necessary to replace part of the ketone solvent with an aromatic hydrocarbon such as benzene, toluene, ethyl benzene, propyl benzene from 6 to 10 carbon atoms and so forth having a relatively low boiling point. The aromatic hydrocarbon is used in an amount of from about 4 to 20, preferably 5 to 10%, by weight of the total weight of solvent employed to maintain the proper dispersion of the pigments and avoid pigment flotation (stratification or settling of pigments where there are differences in gravities). In some cases low molecular weight esters or mixtures of esters may be used as an alternative solvent system for the ketone solvents. Examples of such esters are ethyl acetate, propyl acetate, butyl acetate, ethyl butyrate, butyl butyrate and so forth. Other known solvents such as alcohols, ethers, Cellosolve, chlorinated solvents, and cyclic ketones are undesirable in the composition.

(i) Other materials are desirably added to the composition in minor amounts such as lecithin to improve leveling and the antioxidants or antidegradants well known to the polyvinyl halide and polyurethane art such as epoxides, organic phosphites, chlorinated organic phosphites, substituted aromatic amines, certain substituted phenols, barium-cadmium soaps or complexes and so forth.

The composition is deposited on release paper 1 to provide when dry a layer 5 in an amount of from about 1.9 to 2.10 oz./sq. yd. The cured scuff resistant coating should have a tensile strength of from about 500 to 2500 p.s.i., a minimum elongation of 300% and a maximum modulus of 200 p.s.i. at 100% elongation to obtain a soft drape.

A useful polyurethane-resin coating composition according to the above is obtained by mixing together in a suitable mixing apparatus under a nitrogen atmosphere the following materials:

| Material: | Parts by weight |
|---|---|
| Polyurethane prepolymer (3.5% free NCO prepared from hexamethylene diisocyanate and hydroxy terminated 60/40 ethylene butylene adipate) | 100 |
| Partially hydrolyzed vinyl chloride-vinyl acetate copolymer (VAGH; Union Carbide Corporation) | 10 |

| Material: | Parts by weight |
|---|---|
| Mixed metal soap vinyl stabilizer (Ferro 223, a composition of cadmium octoate with an organic inhibitor) | 0.42 |
| Epoxy resin vinyl stabilizer (DER 332; diglycidyl ether of bisphenol A having an epoxide equivalent weight of about 179; Dow Chemical Company) | 0.36 |
| 1,4-butane diol (anhydrous) | 1.9 |
| Polyester resin (dipropylene glycoltrimethylol propane-adipate, OH number of 52) | 20 |
| Carbon black, preground in the polyester resin | 10 |
| Silicone block copolymer having the following formula $$C_2H_5-Si\begin{matrix}O-[(CH_3)_2SiO]_6-(C_nH_{2n}O)_w-C_4H_9\\O-[(CH_3)_2SiO]_6-(C_nH_{2n}O)_w-C_4H_9\\O-[(CH_3)_2SiO]_6-(C_nH_{2n}O)_w-C_4H_9\end{matrix}$$ where $(C_nH_{2n}O)_w$ is a mixed polyoxyethylene-oxypropylene block having about 17 oxyethylene and 13 oxypropylene units | 1.0 |
| Lecithin (Yelkins TDS; soybean lecithin; Ross & Row, Inc., New York, N.Y.) | 0.25 |
| Dibutyl tin dilaurate | 0.25 |
| Solvent—methyl ethyl ketone, 50% by weight; toluene, 10% by weight; methyl isobutyl ketone, 40% by weight | 108 |

Total solids=60%, 2 to 3 hours pot life, and ratio NCO/OH=108.

(3) THE FABRIC (23)

The fabric can be formed of fibers of linen, nylon, cotton, rayon, silk, wool, or polyester (Dacron), polyacrylonitrile, modacrylic or other mixtures thereof. The fabric may be woven or non woven. However, it is preferred that it be a light weight, woven fabric of from about 1 to 2 ounces per square yard. It may be square woven or tricot, or circular knit. The fabric may also be of the "brushed" type. The fibers should be fine (preferably 15–70 denier) and the fabric should have a high count so that the fabric pattern does not show through or is apparent from the coated side. The fabric should be desized prior to use but may be dyed. In some instances especially when using nylon and a polyesterurethane-resin composition having a resin content on the high side of the resin range and a high solids content in the composition, it is desirable to treat the fabric with a resorcinol-formaldehyde resin or other adhesive dependent on the fiber (for example an isocyanate adhesive is useful for polyesters) prior to coating it with the polyurethane-resin scuff coat composition to improve adhesion. This may readily be accomplished by treating the fabric in an aqueous solution containing about 2% solids of an ammonia stabilized resorcinol-formaldehyde resin B stage (ratio of formaldehyde to resorcinol about 2:1) and drying in air at about 200 to 350° F. Instead of dipping the fabric in the RF solution, the RF solution may be printed on the fabric (passed through printing rolls). About 1½ to 2% by weight pickup of the resorcinol-formaldehyde resin on the fabric is adequate for purposes of adhesion. Other proportions may be used for other adhesives. As shown in FIGURE 2 of the drawing in representative laminate 25 fabric layer 23 can weigh about 0.95 to 1.25 oz./sq. yd. while composition layer 5 will weigh about 1.90 to 2.10 oz./sq. yd.

(4) THE TOP OR SLIP COMPOSITION COATING (47)

The slip (low friction) coating composition comprises a polyesterurethane prepolymer similar to that used in the scuff resistant layer discussed above except that only aliphatic diisocyanates are employed. Moreover, the total amount of diisocyanate employed is less than the total amount of active hydrogen groups (—OH and any —COOH groups) of the polyester to be reacted with the diisocyanate to form the prepolymer and the horny active hydrogen containing resinous polymer. Likewise, the same horny resinous polymers are employed although in some instances they may be partially replaced with high molecular weight polyvinyl chloride. The resinous polymer is used in an amount of from about 125 to 225, preferably from about 150 to 200, parts by weight per 100 parts by weight of said polyesterurethane prepolymer to obtain a coating which is tack free and exhibits slip. A tetravalent tin salt catalyst of the kind shown above with respect to the scuff resistant coating composition is also employed in the slip coating composition. It is used in an amount of from about 0.1 to 1.0, preferably about 0.4 to 0.7, part per 100 parts by weight of the prepolymer. The slip characteristics of the finished laminate may be improved by using a scuff coating prepared on an embossed carrier. This composition preferably moreover contains a flatting agent such as silica, calcium silicate, etc. also to improve slip. Preferred flatting agents are the silica aerogels (Siloid 244) although other finely divided or powdery, dried silica gels can be used. In some cases it may be desirable to use polyvinylchloride or polymethyl methacrylate resins as flatting agents. The flatting agent is generally used in an amount of from about ½ to 25 parts by weight based on 100 parts of the prepolymer. The flatting agent also may change the slip of the coating. For example from about ½ to 10 parts of flatting agent gives bright to semi bright finishes while from about 15 to 25 parts gives dull or matte finishes. Embossing as noted above may be combined with the use of flatting agents. The ingredients are mixed with one or more of the useful solvents shown above to provide a total solids content in the solvent of from about 5 to 25, preferably about 15, percent by weight. Additionally the printing roll 43 and amount of deposit from this roll may determine to some degree the brightness or dullness of this slip coat. The type of print roll used and the total solids can be adjusted to give the desired amount of slip coat on the scuff coat. This composition is deposited on layer 5 to provide when dry slip coat 47 in an amount of from about 0.10 to 0.50 oz./sq. yd. At the higher level of about 0.50 oz./sq. yd. a better, although somewhat duller, slip finish is obtained. The laminate shown in FIGURE 4 is an excellent material for making sportswear and rainwear. For example, using nylon as the fabric 23 at 1.1 oz./sq. yd. and the scuff resistant layer 5 at 2 oz./sq. yd. the total weight of the laminate is only from 3.2 oz./sq. yd. to 3.60 oz./sq. yd. The lightweight laminate has excellent hand and drape.

A very useful composition for obtaining a slip coating is as follows:

| Material: | Parts by weight |
|---|---|
| Prepolymer, 3.5% free —NCO, of 60/40 polyethylene-butylene adipate and hexamethylene diisocyanate | 100.0 |
| Partially hydrolyzed vinyl chloride-vinyl acetate copolymer (VAGH) | 200.0 |
| Silica aerogel | 5.0 |
| Dibutyl tin dilaurate | 0.5 |
| Methyl ethyl ketone | 1700.0 |

The materials are mixed together in conventional mixing apparatus under nitrogen or in an atmosphere free of moisture and stored under such an atmosphere until needed.

(5) THE PATENT LEATHER TYPE COMPOSITION COATING (65)

The patent leather type composition to make a very bright glossy layer comprises a polyester triol having an OH number of from about 300 to 400, preferably about 330 to 350 and an organic triisocyanate. The polyester can be a castor oil triol or can be a polyester prepared by the reaction of a triol such as trimethylol propane, hexane triol and the like with an aliphatic dicarboxylic acid, preferably saturated, having from 8 to 20 carbon atoms such as sebacic acid, suberic acid and so forth and a low molecular weight glycol having from 3 to 6 carbon atoms such as 1,3-propylene glycol, diethylene glycol, 1,6-hexane diol and so forth having 3-6 carbon atoms between OH groups. The diol and triol should be used in an amount in excess of the dicarboxylic acid. Moreover, the molar ratio of the triol to the diol should be about 0.8:3 to 1.2:3, preferably about 1:3.

The isocyanate employed is a triisocyanate having 4-22 carbons between NCO groups. It is preferably an aliphatic triisocyanate such as the reaction product of hexamethylene diisocyanate, heptamethylene diisocyanate, decamethylene diisocyanate and other aliphatic diisocyanates having 4 to 10 carbon atoms between NCO groups with water. In addition to the straight chain isocyanates hydrogenated methylene triphenyl isocyanate and other saturated triisocyanates can be used. These triisocyanates are necessary to maintain color stability where the coating is unpigmented (to obtain maximum gloss). If color stability is not a problem, other triisocyanates can be used such as naphthalene triisocyanate, p,p′,p″-triphenyl methane triisocyanate, "Papi" (The Carwin Company) having the general formula:

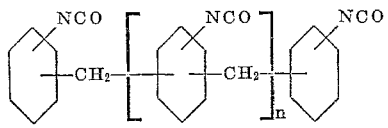

where $n$ has an average value of 1 and so forth. Also, the phosgenated product of the reaction of aniline and formaldehyde can also be used. It, however, is much preferred to employ the aliphatic triisocyanates.

The triisocyanate is used in an amount sufficient to chain extend crosslink and cure the polyester triol.

The composition should also contain a tin catalyst as discussed supra in an amount of from about 0.03 to 0.25, preferably about 0.08 to 0.15, part by weight based on 100 parts by weight of the polyester triol.

Sufficient ketone or ester solvent should be used to give a solids content of from about 35 to 45%, preferably about 40%. Other volatile organic solvents may be used if desired.

A useful patent finish coat to impart a high gloss patent finish is shown below:

Material: Parts by weight
  Castor oil triol, Baker Polycin 52, 340 OH
    number, viscosity 8.8 stokes _____ 100.0
  Trifunctional hexamethylene diisocyanate-
    water adduct, Desmodur N _____ 120.0
  Dibutyl tin dilaurate _____ 0.1
  Methyl ethyl ketone _____ 350.0

The above materials are mixed together in a suitable mixer under a moisture free atmosphere and stored in a sealed container until used in conjunction with the coating process.

The degree of gloss is increased by an increase in pickup or deposit of the "patent" coating over the range of 0.25 to 1.0 oz./sq. yd. (dry weight) which is controlled by the print roll. The pickup required to obtain a given level of gloss is also affected by the smoothness of the scuff resistant coat which depends on the smoothness of the finish of the release paper on which the scuff resistant coating is cast. Moreover, as pointed out above when using the patent coating, it is preferred to employ a polyester fabric or one in which the fibers do not shrink or relax. When nylon is used it is believed that some of the solvent (and a large amount is required here) penetrates the scuff resistant layer to, or the solvent vapors themselves, attack the nylon fibers to cause relaxation of the fibers and puckering or rippling of the fabric. Alternatively some softening of the scuff resistant layer may itself permit relaxation of the nylon fibers.

(6) THE FLOCKED COATING (86)

The flock used can be any natural or synthetic fiber such as rayon, cotton, linen, nylon, wool, silk, polyester and so forth and mixtures thereof. It is desirably the same as the fabric used. The particle size of the random cut cotton flock or cotton linters is from about 40 to 100 mesh. Other natural fibers may be about the same. The synthetic fibers, uniform or random cut, are from about 1½ to 50 denier and have a length of from about 0.015 to 0.250 inch. The flock is desirably dyed prior to applying to the adhesive coated laminate. The thickness of the flock layer will vary depending on the intended use. In some instances where novelty finishes are desired, finely divided aluminum and bronze powders may be employed to impart opacity and reflectivity (they also may be used in the scuff resistant coating or slip coating). The fabric backing used with the flocked laminate is preferably a brushed fabric, i.e., a double woven fabric in which loops are formed and which is brushed to give a soft finish. In one construction a blend of nylon and rayon are used in which the nylon gives the desired strength.

Any suitable adhesive or cement can be employed to secure the flock to the scuff resistant layer 5. A useful adhesive is the polyurethane prepolymer employed in layer 5 and which is dissolved in ethylene dichloride and which contains from about ½ to 2 parts by weight per 100 parts by weight of the prepolymer of a tertiary amine catalyst such as those well known in the urethane art. Another useful adhesive is an aqueous emulsion of a curable composition of a copolymer of ethyl acrylate and methacrylic acid. Still other adhesives or cements can be used.

Instead of making a polyurethane prepolymer separately as discussed above the diisocyanate and polyester used can be mixed with the other ingredients used to make the various layers and the entire mixture cast continuously to form the desired layers. In such cases the ingredients of the mixture or composition to form the various layers are delivered by separate pipe lines or in only a few depending upon their compatibility to a mixing device where they are mixed rapidly and then cast. Instead of using printing rolls to form coatings, the coatings may be formed by means of doctor blades, by spraying and so forth. Moreover, the laminate can be turned over and printed on the underside. Instead of using drying ovens to remove solvent and dry or cure the various laminates other drying means can be used such as exhaust fans and infra red, dielectric heating, conduction heating and so forth. Furthermore, with respect to FIGURE 1 and the discussion of the same, the laminate can as pointed out be festooned cured and after curing, the release paper can be stripped from the laminate and the remaining laminate turned over and treated according to any one of the methods shown in FIGURES 3, 5 and 7.

Furthermore, the processes disclosed herein can be modified using in general the apparatus disclosed herein or parts thereof. For example, the slip coating can be deposited first on the release carrier or paper, then the scuff resistant coating is applied to the surface of the slip coating, and finally the fabric can be "kiss-coated" onto the surface of the scuff resistant coating. Moreover, the slip coating can be applied to the carrier, the patent or gloss coating applied on the surface of the slip coating, the scuff resistant layer deposited on the surface of the patent layer, and finally the fabric is applied to the scuff resistant layer. The various layers may be dried and cured as previously described. The releasable carriers may then be stripped from the laminates.

Accordingly, it is apparent that in accordance with the provisions of the patent laws many changes can be made in the processes and products disclosed herein without departing from the present invention.

What is claimed is:
1. A lightweight coated fabric having excellent hand and drape and comprising a fabric layer and a scuff resistant composition layer secured to one side of said fabric layer, said composition layer comprising the reaction product of an organic diisocyanate, an hydroxyl terminated polyester diol having an average molecular weight of from about 2000 to 2400, a horny resin compatible with the polyurethane formed to provide homogenous films which do not craze on an elongation of greater than 50% of the composition, soluble in volatile organic solvents for said composition prior to curing and having from about 0.5 to 7% by weight active hydrogen groups, and an average molecular weight of from about 2,500 to 350,000, a low molecular weight glycol, and a branched chain polyester having more than 2 hydroxyl groups produced by the reaction of a glycol, dicarboxylic acid and a polyol having more than 2 hydroxyl groups in an amount of from about 0.01 to 10 mol percent based on the total mols of glycol, dicarboxylic acid and polyol used to make the branched polyester and having an average molecular weight of from about 2000 to 4000, sufficient diisocyanate being present to provide an excess of isocyanate groups over the active hydrogen groups in said resin, said polyesters and said glycol, said resin being used as a crosslinker in a minor amount by weight sufficient to obtain rapid gelation of the composition without excessive penetration of the composition into the fabric, said glycol being used as a chain extender in a minor amount by weight to obtain the desired adhesion of the composition to the fabric and said branched chain polyester being used in a minor amount by weight as a reactive pigment vehicle, each, as compared to the total weight of said organic diisocyanate and said polyester diol.

2. A lightweight coated fabric according to claim 1 containing additionally a layer of a slip coating composition adherently disposed on the layer of said scuff resistant layer opposite to said fabric layer said slip coating composition comprising the reaction product of an aliphatic diisocyanate, an hydroxyl terminated polyester diol having an average molecular weight of from about 2000 to 2400, and the compatible horny resin of claim 1 in an amount by weight greater than said diisocyanate and said polyester and being soluble in volatile organic solvents for said slip coating compositions prior to curing and having from about 0.5 to 7% by weight of active hydrogen groups and an average molecular weight of from about 2,500 to 350,000, said diisocyanate being present in an amount insufficient to react with all of the hydroxyl groups of said polyester and with all of the active hydrogen groups of said resin.

3. A lightweight coated fabric according to claim 1 containing additionally a releasable layer disposed on the surface of said scuff resistant layer opposite to said fabric layer.

4. A lightweight coated fabric according to claim 1, (A-1) containing additionally a layer of a gloss coating composition adherently disposed on the scuff resistant layer opposite to said fabric layer, said gloss coating comprising the reaction product of a polyester triol having a hydroxyl number of from about 300 to 400 and an organic triisocyanate in an amount sufficient to cure said polyester triol and (A-2) further containing additionally a layer of a slip coating composition adherently disposed on said gloss layer opposite said scuff resistant layer, said slip coating composition comprising the reaction product of an aliphatic diisocyanate, an hydroxyl terminated polyester diol having an average molecular weight of from about 2000 to 4000, and the compatible horny resin of claim 1 in an amount by weight greater than said diisocyanate and said polyester and being soluble in volatile organic solvents for said slip coating composition prior to curing and having from 0.5 to 7% by weight of active hydrogen groups and an average molecular weight of from about 2,500 to 350,000, said diisocyanate being present in an amount insufficient to react with all of the hydroxyl groups of said polyester and with all of the active hydrogen groups of said resin.

5. A lightweight coated fabric according to claim 1, (B-1) containing additionally a layer of an adhesive coating composition adherently disposed on the surface of said scuff resistant layer opposite to said fabric layer, and (B-2) further containing additionally a flock layer of finely divided material adherently disposed on said adhesive layer opposite to said scuff resistant layer.

6. A lightweight coated fabric having excellent hand and drape and comprising a relatively thin fabric layer and a relatively thin scuff resistant composition layer secured to one side of said fabric layer, said composition layer comprising the reaction product of (C-1) an isocyanate terminated prepolymer of an organic diisocyanate and a polyester diol having an average molecular weight of from about 2000 to 2400, (C-2) a compatible horny resin being selected from the group consisting of cellulose acetate butyrate, vinyl chloride-vinyl acetate-maleic acid terpolymer, vinyl chloride-beta hydroxy ethyl acrylate copolymer, vinyl chloride-methyl methacrylate-beta hydroxy propyl methacrylate terpolymer, partially hydrolyzed vinyl chloride-vinyl acetate copolymer, and end treated condensation products of Bisphenol A and epichlorohydrin, having from about 0.5 to 7% by weight of active hydrogen groups and being soluble in a low molecular weight solvent selected from the group consisting of ketones and esters and having an average molecular weight of from about 2,500 to 350,000, (C-3) a glycol having from 3 to 6 carbon atoms in an amount of from about 1 to 3 parts by weight per 100 parts by weight of (C-1), and (C-4) a polyester having from 3 to 6 hydroxyl groups and an average molecular weight of from about 2000 to 4000 in an amount of from about 10 to 30 parts by weight per 100 parts by weight of (C-1), in admixture with, (C-5) a tetravalent tin salt catalyst having the formula

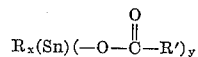

where R is an alkyl group of from 2 to 8 carbon atoms, R' is an aliphatic hydrocarbon radical of from 5 to 17 carbon atoms, $x$ is a number from 1 to 3 and $y$ is a number from 3 to 1, (C-6) a minor amount by weight of a water soluble polysiloxane polyoxyalkylene block copolymer, and (C-7) a pigment in an amount of from about 10 to 30 parts by weight per 100 parts by weight of (C-1), (C-8) said diisocyanate being used in an amount sufficient to provide from about 5 to 25% molar excess isocyanato groups over the total active hydrogen groups of the polyester of (C-1) and of (C-2), (C-3) and (C-4), and (C-9) the ratio of (C-2) to (C-5) being from about 18:0.05 to 8:0.25 parts by weight per 100 parts by weight of (C-1).

7. A lightweight coated fabric according to claim 6 containing additionally a relatively thin layer of a slip coating adherently disposed on the layer of said scuff resistant coating opposite to said fabric layer, said slip coating composition comprising the reaction product of (D-1) an isocyanate terminated prepolymer of an aliphatic diisocyanate and a polyester diol having an average molecular weight of from about 2000 to 2400, and (D-2) a compatible horny resin being selected from the group consisting of cellulose acetate butyrate, vinyl chloride-vinyl acetate-maleic acid terpolymer, vinyl chloride-beta hydroxy ethyl acrylate copolymer, vinyl chloride-methyl methacrylate-beta hydroxy propyl methacrylate terpolymer, partially hydrolyzed vinyl chloride-vinyl acetate copolymer, and end treated condensation products of Bisphenol A and epichlorohydrin, having from about 0.5 to 7% by weight of active hydrogen groups and being soluble in a low molecular solvent selected from the group consisting of ketones and esters and having an average molecular weight of from about 2,500 to 350,000, the parts by weight ratio of said resin to said prepolymer being from about 125:100 to 225:100, in admixture with (D-3) a tetravalent tin catalyst in an amount of from about 0.1 to 1.0 part by weight per 100 parts by weight of (D-1) and having the formula

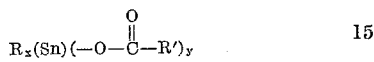

where R is an alkyl group of from 2 to 8 carbon atoms, R' is an aliphatic hydrocarbon radical of from 5 to 17 carbon atoms, $x$ is a number from 1 to 3 and $y$ is a number from 3 to 1, and (D-4) a finely divided flatting agent in an amount of from about 0.5 to 25 parts by weight per 100 parts by weight of (D-1).

8. A lightweight coated fabric according to claim 6 containing additionally a silicone coated thin flexible release paper layer disposed on the surface of said scuff resistant layer opposite to said fabric layer.

9. A lightweight coated fabric according to claim 6, (E-1) containing additionally a relatively thin layer of a gloss coating composition adherently disposed on the scuff resistant layer opposite to said fabric layer, said gloss coating comprising the reaction product of a polyester triol having an OH number of from about 300 to 400 and a saturated aliphatic triisocyanate having from 4 to 22 carbon atoms between isocyanato groups in an amount sufficient to cure said polyester triol and in admixture with a tin catalyst in an amount of from about 0.03 to 0.25 part by weight per 100 parts by weight of said polyester triol, said tin catalyst having the formula

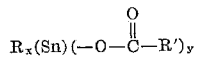

where R is an alkyl group of from 2 to 8 carbon atom, R' is an aliphatic hydrocarbon radical of from 5 to 17 carbon atoms, $x$ is a number from 1 to 3 and $y$ is a number from 3 to 1, and (E-2) further containing additionally a relatively thin layer of a slip coating composition adherently disposed on said gloss layer opposite said scuff resistant layer, said slip coating composition comprising (D-1) an isocyanate terminated prepolymer of an aliphatic diisocyanate and a polyester diol having an average molecular weight of from about 2000 to 2400, and (D-2) a compatible horny resin being selected from the group consisting of cellulose acetate butyrate, vinyl chloride-vinyl acetate-maleic acid terpolymer, vinyl chloride-beta hydroxy ethyl acrylate copolymer, vinyl chloride-methyl methacrylate-beta hydroxy propyl methacrylate terpolymer, partially hydrolyzed vinyl chloride-vinyl acetate copolymer, and end treated condensation products of Bisphenol A and epichlorohydrin, having from about 0.5 to 7% by weight of active hydrogen groups and being soluble in a low molecular weight solvent selected from the group consisting of ketones and esters and having an average molecular weight of from about 2,500 to 350,000, the parts by weight ratio of said resin to said prepolymer being from about 125:100 to 225:100, in admixture with (D-3) a tetravalent tin catalyst in an amount of from about 0.1 to 1.0 part by weight per 100 parts by weight of (D-1) and having the formula

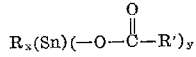

where R is an alkyl group of from 2 to 8 carbon atoms and R' is an aliphatic hydrocarbon radical of from 5 to 17 carbon atoms, $x$ is a number from 1 to 3 and $y$ is a number from 3 to 1, and (D-4) a finely divided flatting agent in an amount of from about 0.5 to 25 parts by weight per 100 parts by weight of (D-1).

10. A lightweight coated fabric according to claim 6, (F-1) containing additionally a relatively thin layer of an adhesive coating composition adherently disposed on the surface of said scuff resistant layer opposite to said fabric layer, and (F-2) further containing additionally a relatively thin flock layer of finely divided fibrous material adherently disposed on said adhesive layer opposite to said scuff resistant layer.

No references cited.

ALEXANDER WYMAN, *Primary Examiner.*

MORRIS SUSSMAN, *Examiner.*

R. H. CRISS, *Assistant Examiner.*